W. A. GIBSON.
WATER HEATER AND PURIFIER.
APPLICATION FILED SEPT. 13, 1909.
973,773.
Patented Oct. 25, 1910.
2 SHEETS—SHEET 1.
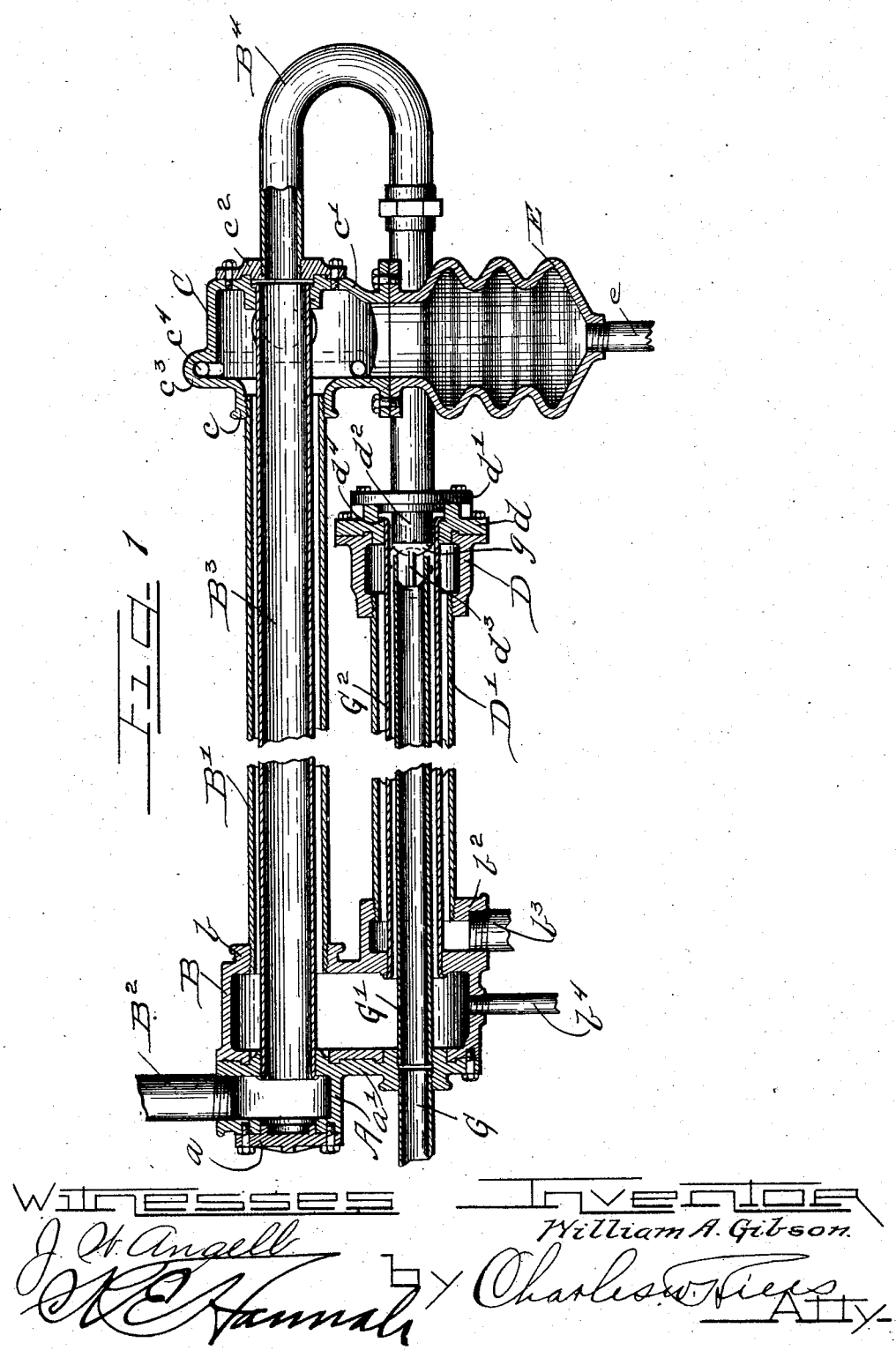

W. A. GIBSON.
WATER HEATER AND PURIFIER.
APPLICATION FILED SEPT. 13, 1909.
973,773.
Patented Oct. 25, 1910.
2 SHEETS—SHEET 2.
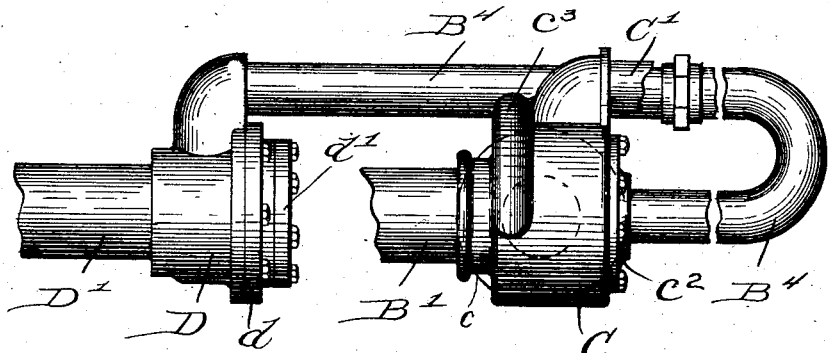
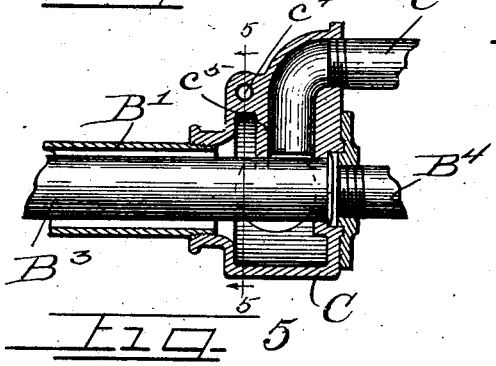
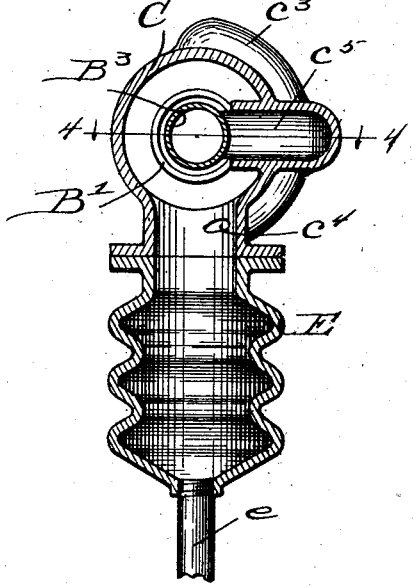
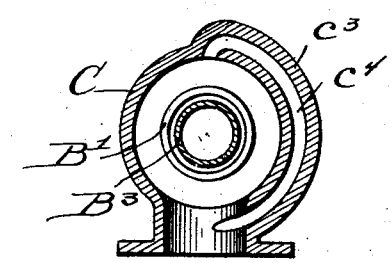
WITNESSES
J. W. Angell.
H. C. Hannah
INVENTOR
William A. Gibson
by Charles C. Niles
Atty.

UNITED STATES PATENT OFFICE.

WILLIAM ASA GIBSON, OF PEORIA, ILLINOIS.

WATER HEATER AND PURIFIER.

973,773.  Specification of Letters Patent.  Patented Oct. 25, 1910.

Application filed September 13, 1909. Serial No. 517,471.

*To all whom it may concern:*

Be it known that I, WILLIAM ASA GIBSON, a citizen of the United States, and a resident of the city of Peoria, in the county of Peoria and State of Illinois, have invented certain new and useful Improvements in Water Heaters and Purifiers; and I do hereby declare that the following is a full, clear, and exact description of the same, reference being had to the accompanying drawings, and to the letters of reference marked thereon, which form a part of this specification.

This invention relates to improvements in feed water heaters and separators adapted to raise the temperature of the feed water before its admission to the boiler and to separate the impurities therefrom which are held in the solution or suspension.
In various localities the water contains numerous impurities held in suspension as well as various mineral salts and other scale forming substances held in solution which accumulate as scale on the inner surface of the boiler and greatly interfere with its action and sometimes cause serious accidents if not removed. Many different devices have been resorted to to remove these impurities but most of them while being able to separate the heavier precipitates have failed to remove the lighter ones thereby permitting them to enter the boiler.

The object of this invention is to provide a device capable of raising the temperature of the feed water to approximately that of the boiler, before it enters the same and by thoroughly agitating the water while heating to cause the solid matter held in suspension or solution to be precipitated and separated thus delivering the water to the boiler in practically a pure state.

It is a further object of the invention to provide a device capable of not only separating from the water those precipitates which are heavier than the water but also those which are light enough to float and would ordinarily pass into the boiler with the water instead of settling in the mud drums or chambers.
The invention consists in the matters hereinafter described and more fully pointed out and defined in the appended claims.

In the drawings: Figure 1 is a fragmentary longitudinal section of a device embodying my invention. Fig. 2 is a fragmentary top plan view of the same. Fig. 3 is a vertical transverse section taken through the mud drum and secondary separating chamber. Fig. 4 is a section taken on line 4—4 of Fig. 3, and, Fig. 5 is a section taken on line 5—5 of Fig. 4.

As shown in said drawings: A represents a casing of any preferred construction and material affording a steam chamber and which, as shown, is provided in one end thereof with an aperture affording access to the interior of the casing which is normally closed by means of a removable head $a$ rigidly bolted to said casing. Said casing is provided on the opposite end thereof with a downwardly directed flange $a'$ to which and to the end of said casing is rigidly engaged by bolting or in any other desired manner the casing B, which as shown is of greater diameter than said steam chamber and extends downwardly therefrom and affords the primary separating chamber in which some of the heavier materials are deposited. An aperture is provided through the continuous walls of said casings A and B in axial alinement with the aperture in the opposite head of said casing A and the outer head of the casing B is provided with an aperture in axial alinement therewith and of greater diameter, and surrounding the same is an outwardly directed, internally screw threaded boss $b$. The secondary separating chamber comprises a casing C which is provided in its side adjacent the casing B with an aperture from which extends an outwardly directed internally threaded boss $c$ complemental with the boss $b$ and in axial alinement therewith. A pipe B′ of any preferred length has threaded engagement in said bosses $b$ and $c$ and affords communication between the chambers in the casings B and C.

A steam supply pipe $B^2$ leads from the steam chest of the engine (not shown) or from any preferred source of supply and opens into the casing A and an expansion pipe $B^3$ is rigidly engaged at one end in the continuous walls of the casings A and B and opens from the casing A and extends through the casing B and axially of the pipe B′ and is connected in and opens through the opposite or outer head $c'$ of the casing C. Said head $c'$ of the casing C is provided with an internally threaded collar $c^2$ which is rigidly bolted thereto and having threaded engagement therein in axial alinement with the pipe $B^3$ is the pipe $B^4$ which as shown is of smaller diameter than the pipe B³ and is bent back upon itself and opens into the side of a casing D affording a steam chamber from which leads a pipe D' which communicates at its opposite end in a chamber $b^2$ formed integrally with the casing B and in the bottom of which is connected a return pipe $b^3$ for the steam which returns the same to the boiler or other sources of supply in case live steam is used or opens to the atmosphere if exhaust steam is used.

A feed water pipe G leads from the boiler pump or injector of any desired type and connects in the flange $a'$ and connected in said flange and extending through the casing B in axial alinement with said pipe G and extending axially of said pipe D' into the casing D is a nozzle G'. Said casing D is provided on its end opposite from the pipe D' with a flanged collar $d$ which is rigidly engaged thereto affording a tight joint therewith and to which is rigidly engaged the head $d'$ which closes the casing. A boss $d^2$ of smaller diameter than the aperture in said collar is provided on the inner face of said head and projects inwardly into close proximity to the end of the nozzle G' and is provided with a rounded end on which are deflector blades $d^3$ arranged at an angle with each other and extending into the nozzle. A return pipe G² is rigidly engaged at one end behind a shoulder $d^4$ in said collar $d$ and at the other end opens into the casing B and is of such diameter that it affords a passage between it and the pipe G' for the admission of the water to the casing B after leaving said nozzle G' and also between it and the pipe D' for the passage of steam thereby affording a steam jacket about the return pipe.

The secondary separating chamber C is provided in the bottom thereof with an aperture and rigidly connected in the bottom of said chamber in axial alinement with said aperture is the mud drum E which, as shown, is provided with a plurality of peripheral corrugations and the bottom of which tapers downwardly to a central point to enable the contents to flow from an outlet pipe $e$ which is connected therein. Said casing C is provided on its outer periphery adjacent its forward end with a peripheral rib $c^3$ which extends from the top thereof approximately half way around the casing and is cored to provide a channel $c^4$ which opens at its upper end from the top of the secondary separating chamber and at its lower end into the bottom thereof adjacent the mud drum E and provides a passage through which any lighter precipitates which collect in the area of comparatively still water in the upper forward portion of said chamber may pass to the mud drum. A cylindrical wall $c^5$ projects inwardly from one side of the casing C and fits closely to the pipe B³ except at its top and bottom which are cut away to afford outlet openings for the water, as shown more clearly in Figs. 3 and 4, and a passage leads outwardly therefrom through the casing and a discharge pipe C' connects therein and leads to the boiler.

The operation is as follows: When the water enters through the pipe G it is forced through the nozzle G' under considerable pressure and when it reaches the deflector $d^3$ it is deflected laterally therefrom and thrown with great force against the pipe G² and is turned backwardly through said pipe G² into the casing B. Inasmuch as live steam is constantly passing through the casing D and pipe D' it acts to heat the pipe G² thereby raising the temperature of the water before it enters the primary separating chamber and the heat together with the spraying effect occasioned by the deflector causes the heavier matter held in suspension and solution to be deposited in the bottom of the said primary separating chamber B. The water then passes from said chamber B through the pipe B' in a thin sheet about the expansion pipe B³ where it is heated to a higher temperature by the steam passing therethrough and when it enters the secondary separating chamber C it is at approximately boiler temperature. As the water is expelled into the secondary separating chamber, it is deflected on the outlet side of the pipe B³ both upwardly and downwardly by the wall $c^5$ and rearwardly by the wall $c'$ while the water on the opposite side of the pipe B³ is deflected back causing innumerable currents in said chamber which cause the remaining matters held therein to be separated therefrom. The heavier portions of the material settle in the mud drum E directly from the chamber C and the lighter materials or those which are light enough to float on the water accumulate in the top of the chamber C and pass through the channel or passage $c^4$ downwardly to the bottom of said casing where they are carried with the heavier material into said mud drum and owing to the corrugations therein they collect on the walls of said drum and are prevented from passing with the water into the boiler. Inasmuch as the water is thoroughly heated before reaching the boiler and has been constantly agitated all the material which would ordinarily precipitate in the boiler has been removed leaving the water practically pure.

I claim as my invention:

1. In a device of the class described the combination with means for heating water to a high temperature of a primary separating chamber adapted to separate the heavier precipitates from the water, a secondary separating chamber in communication with said primary chamber, a mud drum beneath the same and a passage leading from the top of the secondary separating chamber and discharging into the mud drum.

2. In a device of the class described the combination with a feed pipe of a nozzle connected therewith, a deflector at the end of said nozzle, a primary separating chamber, a return pipe leading from said deflector to said chamber and inclosing said nozzle, means for heating said return pipe, a secondary separating chamber, a water pipe connecting said chambers, a steam pipe extending axially thereof and a corrugated mud drum beneath said secondary separating chamber adapted to receive deposits therein.

3. In a device of the class described the combination with a primary and a secondary separating chamber communicating with each other, of a heater for raising the water to a high temperature and delivering the water into the primary separating chamber a corrugated mud drum adapted to receive the heavier precipitates by gravity and a passage for conducting the lighter precipitates downwardly to said mud drum.

4. In a device of the class described the combination with a primary and a secondary separating chamber of a water pipe opening at its ends into said chambers, a steam expansion pipe extending through said chambers and axially of said water pipe, a steam pipe leading from said expansion pipe, a feed water pipe, a nozzle thereon, extending axially of said steam pipe, a deflector at the end of said nozzle, a return pipe between said nozzle and steam pipe and opening into the primary separating chamber, a corrugated mud drum in open communication with the secondary separating chamber and means for creating a plurality of currents in said secondary separating chamber.

5. In a device of the class described the combination with a primary separating chamber, of a secondary separating chamber, a water pipe connecting said chambers, means for agitating and heating the water before entering said chambers, an inwardly directed wall in the secondary chamber adapted to deflect the water, a mud drum beneath said chamber and a channel opening from the top of said chamber and leading downwardly to the mud drum.

6. In a device of the class described the combination with a primary separating chamber of a secondary separating chamber, a pipe connecting said chambers, a steam expansion pipe extending axially thereof, a steam pipe leading from said expansion pipe, a feed water pipe, a nozzle thereon extending axially of said steam pipe, a return pipe between said nozzle and steam pipe and opening at one end into the primary separating chamber, means closing the other end of said pipe, a deflector thereon extending into said nozzle and adapted to throw the water therefrom against the heated surface of the return pipe, a corrugated mud drum beneath the secondary separating chamber and in open communication therewith and means affording a channel opening from the top of said chamber downwardly to the mud drum.

7. In a device of the class described the combination with the primary and the secondary separating chambers of water pipe opening thereinto, means for heating said water, a cylindric, tubular wall extending into the secondary separating chamber from the side wall thereof into the path of the water entering said chamber, a corrugated mud drum beneath said chamber, and a passage leading from the top of said chamber downwardly to the mud drum.

8. In a feed water heater and purifier a heater for preliminarily raising the temperature of the water, a separating receptacle into which the water is delivered, a heater for further raising the water to a high temperature, and a second separating receptacle into which the water at high temperature is delivered.

9. In a feed water heater and purifier means for preliminarily raising the temperature of the water, a separating receptacle into which the water is delivered, means for further raising the water to a high temperature, a second separating receptacle into which the water at the high temperature is delivered, a mud drum connected with the second receptacle and a passage leading from the top of the second separating receptacle to the mud drum to deliver the lightest impurities thereto.

10. In a feed water heater and purifier means for preliminarily raising the temperature of the water, a separating receptacle into which the water is delivered, means for further raising the water to a high temperature, a second separating receptacle into which the water at the high temperature is delivered, a mud drum connected with the second receptacle, a passage leading from the top of the second separating receptacle to the mud drum to deliver the lightest impurities thereto, and a member extending transversely into the second separating chamber to deflect the water and create currents therein to aid in precipitating the impurities from the water into the mud drum.

11. In a feed water heater and purifier a steam chamber, a plurality of separating chambers, a steam pipe extending from the steam chamber through both of the separating chambers, a water pipe connecting the separating chambers and concentric with the steam pipe, a steam pipe communicating with the first named steam pipe and a water pipe extending therethrough and delivering into one of the separating chambers.

12. In a feed water heater and purifier a steam chamber, a plurality of separating chambers, a steam pipe extending from the steam chamber through both of the separating chambers, a water pipe connecting the separating chambers and concentric with the steam pipe, a steam pipe communicating with the first named steam pipe, a water pipe extending therethrough and delivering into one of the separating chambers in which the heavier precipitates are deposited, a mud drum connected with the other separating chamber and means for delivering the light impurities floating on and adjacent the surface of the water to the mud drum.

13. In a feed water heater and purifier a steam chamber, a plurality of separating chambers, a steam pipe extending from the steam chamber through both of the separating chambers, a water pipe connecting the separating chambers and concentric with the steam pipe, a steam pipe communicating with the first named steam pipe, a water pipe extending therethrough and delivering into one of the separating chambers, in which the heavier precipitates are deposited, a mud drum connected with the other separating chamber, means for delivering the light impurities floating on and adjacent the surface of the water to the mud drum, and means in one of the separating chambers for creating currents in the water to aid in precipitation of the impurities.

14. In a feed water heater and purifier a steam chamber, separating receptacles, a pipe for delivering the water from one receptacle to the other, a heater for subjecting the water to steam heat during such delivery, a primary heater for receiving the steam from the aforesaid heater and pipes for passing the water through said primary heater and delivering the water in a heated state into one of the separating receptacles prior to its delivery to the pipe for delivering the water to the other receptacle.

15. In a feed water heater and purifier a steam chamber, separating receptacles, a pipe for delivering the water from one receptacle to the other, a heater for subjecting the water to steam heat during such delivery, a primary heater for receiving the steam from the aforesaid heater, concentric pipes for passing the water through said primary heater and delivering the water in a heated state into one of the separating receptacles prior to its delivery to the pipe for delivering the water to the other receptacle, a baffle plate for agitating the water prior to its delivery into one of the receptacles and stationary means for agitating the water after its delivery into the other separating receptacle.

16. In a feed water heater and purifier a steam chamber, separating receptacles, a pipe for delivering the water from one receptacle to the other, a heater for subjecting the water to steam heat during such delivery, a heater for receiving the steam from the aforesaid heater, pipes for passing the water through said second named heater and delivering the water in a heated state into one of the separating receptacles prior to its delivery to the pipe for delivering the water to the other receptacle, baffle plate for agitating the water prior to its delivery into one of the receptacles, means for agitating the water after its delivery into the other separating receptacle, a mud drum secured to one of the separating receptacles into which the heavier precipitates fall and a passage for conveying the lightest precipitates into the mud drum from the top of the separating receptacle.

17. In a feed water heater and purifier a plurality of separating receptacles, a pipe for delivering the feed water from one receptacle to the other, a pipe for delivering the feed water into one of the receptacles and a steam pipe concentric with each delivery pipe and a pipe delivering the steam from one steam pipe to the other.

18. In a feed water heater a steam chest, a separating chamber, a steam chest secured thereto on the side opposite the aforesaid steam chest, a second separating chamber, pipes affording communication between the steam chests, a pipe surrounding the steam pipe and delivering water from one separating chamber to the other and pipes concentric with the steam pipe for delivering water into one of the separating chambers.

19. In a feed water heater a steam chest, a separating chamber, a steam chest secured thereto on the side opposite the aforesaid steam chest, a second separating chamber, pipes affording communication between the steam chests, a pipe surrounding the steam pipe and delivering water from one separating chamber to the other, pipes concentric with the steam pipe for delivering water into one of the separating chambers, a mud drum secured to one of the separating chambers and a passage leading from the top of that chamber to the mud drum.

20. In a feed water heater and purifier of the class described communicating separating chambers, means for raising the temperature of the feed water to a high temperature during its passage from one chamber to the other, means for initially heating the feed water before its delivery into one of the separating chambers, a mud drum secured to one of the chambers and a passage connecting the top of the chamber with the top of the mud drum.

In testimony whereof I have hereunto subscribed my name in the presence of two subscribing witnesses.

WILLIAM ASA GIBSON.

Witnesses:
K. E. HANNAH,
LAWRENCE REIBSTEIN.